(No Model.)  7 Sheets—Sheet 1.

O. H. CLARK.
RAILROAD CROSSING GATE.

No. 307,098.  Patented Oct. 28, 1884.

Witnesses —
Thomas W. Bakewell
W. B. Corwin

Inventor —
Oliver H. Clark.
by his attorneys
Bakewell & Kerr

N. PETERS, Photo-Lithographer, Washington, D. C.

(No Model.)

7 Sheets—Sheet 2.

O. H. CLARK.
RAILROAD CROSSING GATE.

No. 307,098. Patented Oct. 28, 1884.

Witnesses:
Thomas W. Bakewell
W. B. Corwin

Inventor:
Oliver H. Clark
by his attorneys
Bakewell & Kerr (No Model.)  7 Sheets—Sheet 3.

O. H. CLARK.
RAILROAD CROSSING GATE.

No. 307,098.  Patented Oct. 28, 1884.

Witnesses  
Thomas W. Bakewell  
W. B. Corwin

Inventor  
Oliver H. Clark  
by his attorneys  
Bakewell Kerr (No Model.) 7 Sheets—Sheet 4.
O. H. CLARK.
RAILROAD CROSSING GATE.

No. 307,098. Patented Oct. 28, 1884.

Witnesses
Thomas W. Bakewell
W. B. Corwin

Inventor
Oliver H. Clark
by his attorneys
Bakewell & Kerr (No Model.)  7 Sheets—Sheet 5.

O. H. CLARK.
RAILROAD CROSSING GATE.

No. 307,098.  Patented Oct. 28, 1884.

Witnesses—
Thomas W. Bakewell
W. B. Corwin

Inventor—
Oliver H. Clark
by his attorneys
Bakewell & Kerr (No Model.)

7 Sheets—Sheet 6.

O. H. CLARK.
RAILROAD CROSSING GATE.

No. 307,098. Patented Oct. 28, 1884.

Witnesses
W. B. Corwin
J. A. Burns.

Inventor
Oliver H. Clark
by his atty's
Bakewell & Kerr (No Model.)  7 Sheets—Sheet 7.

O. H. CLARK.
RAILROAD CROSSING GATE.

No. 307,098.  Patented Oct. 28, 1884.

Witnesses
W. B. Corwin
J. A. Burns.

Inventor
Oliver H. Clark
by his attys
Bakewell & Kerr

UNITED STATES PATENT OFFICE.

OLIVER H. CLARK, OF PITTSBURG, PENNSYLVANIA.

RAILROAD-CROSSING GATE.

SPECIFICATION forming part of Letters Patent No. 307,098, dated October 28, 1884.

Application filed September 11, 1883. (No model.)

*To all whom it may concern:*

Be it known that I, OLIVER H. CLARK, of Pittsburg, in the county of Allegheny and State of Pennsylvania, have invented a new and useful Improvement in Railroad-Crossing Gates; and I do hereby declare the following to be a full, clear, and exact description of the invention, reference being had to the accompanying drawings, forming part of this specification, in which—

Figure 1:
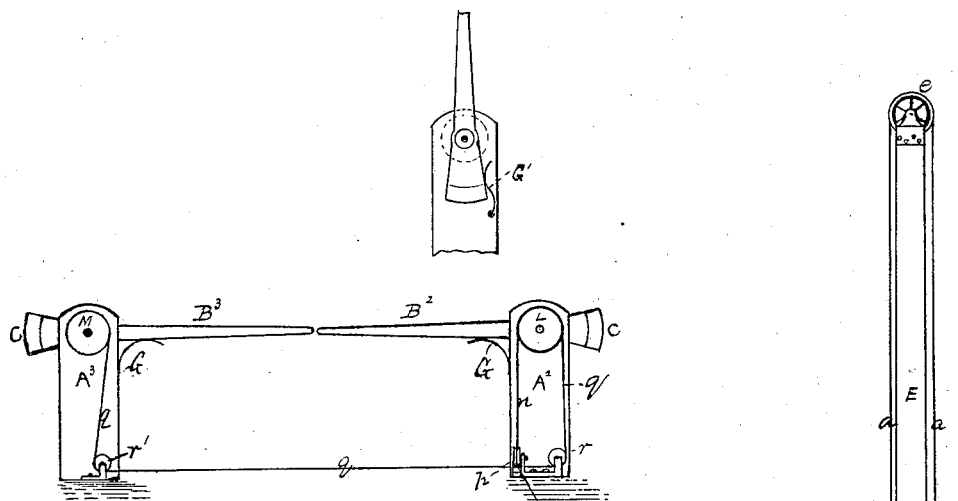
Figure 2:
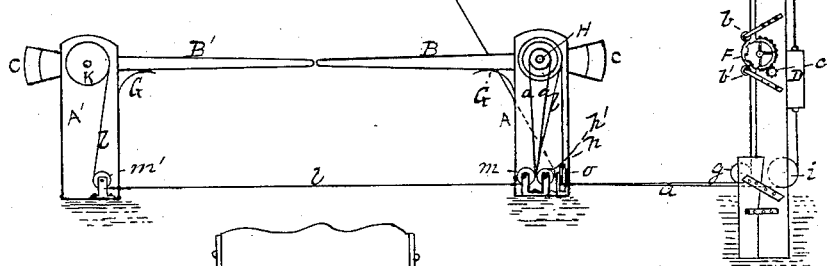
Figure 3:
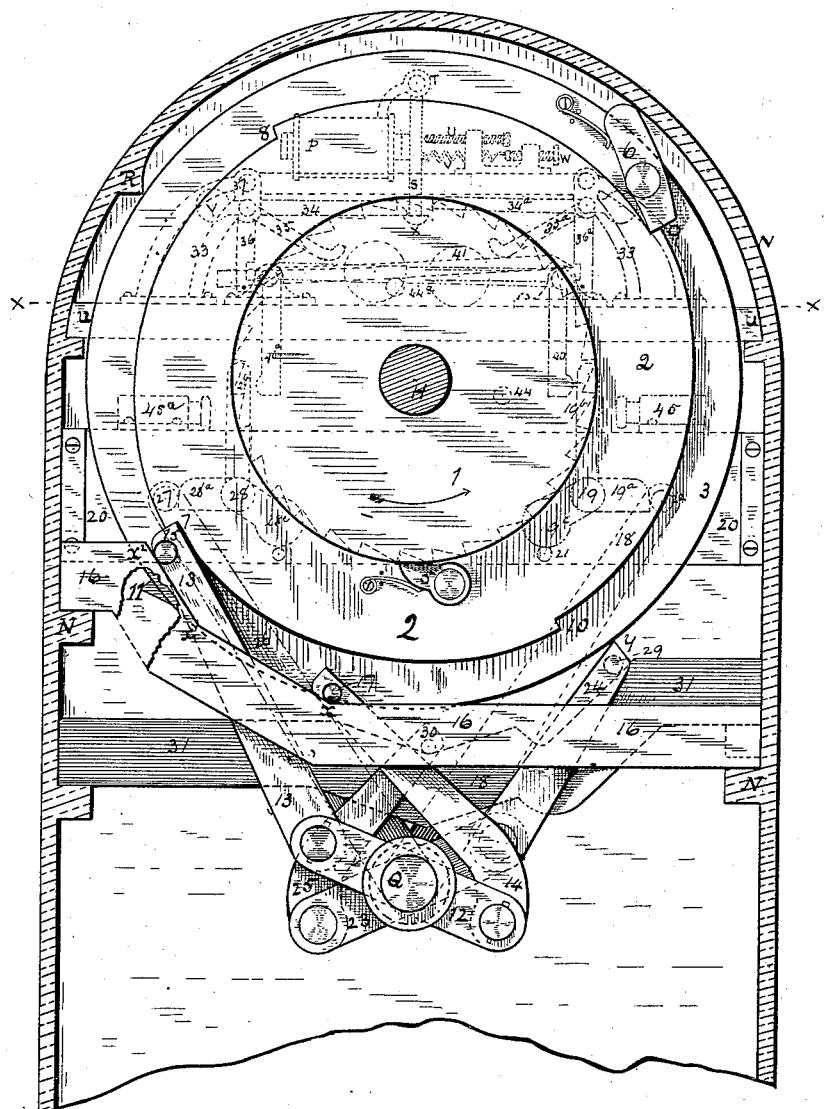
Figure 4:
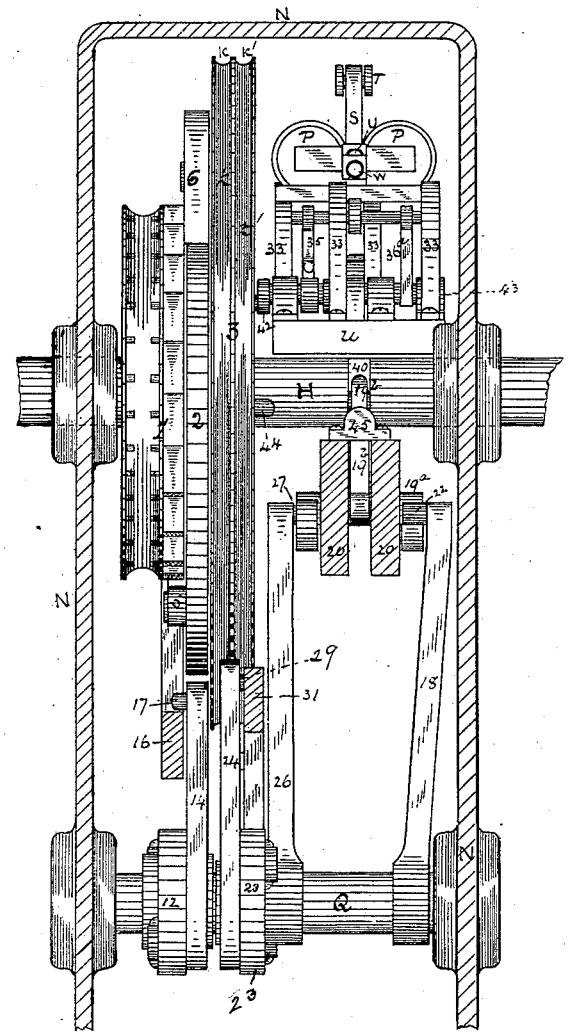
Figure 5:
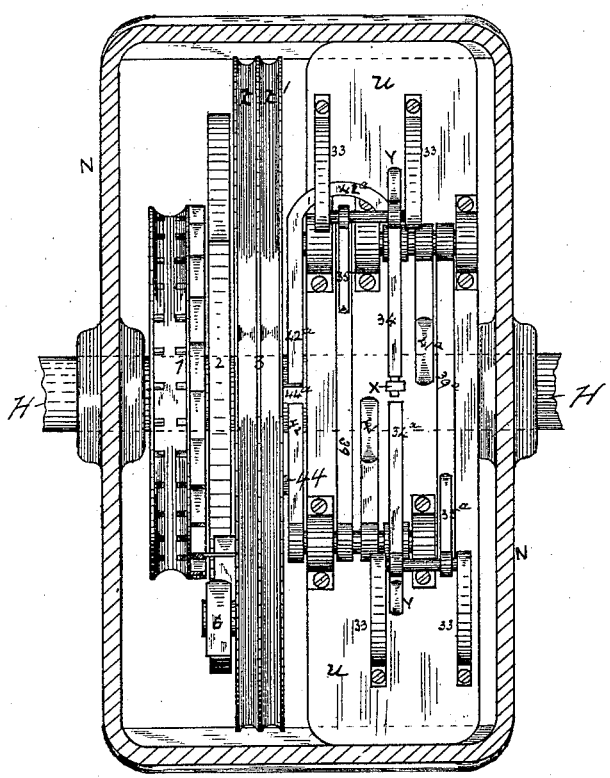
Figure 6:
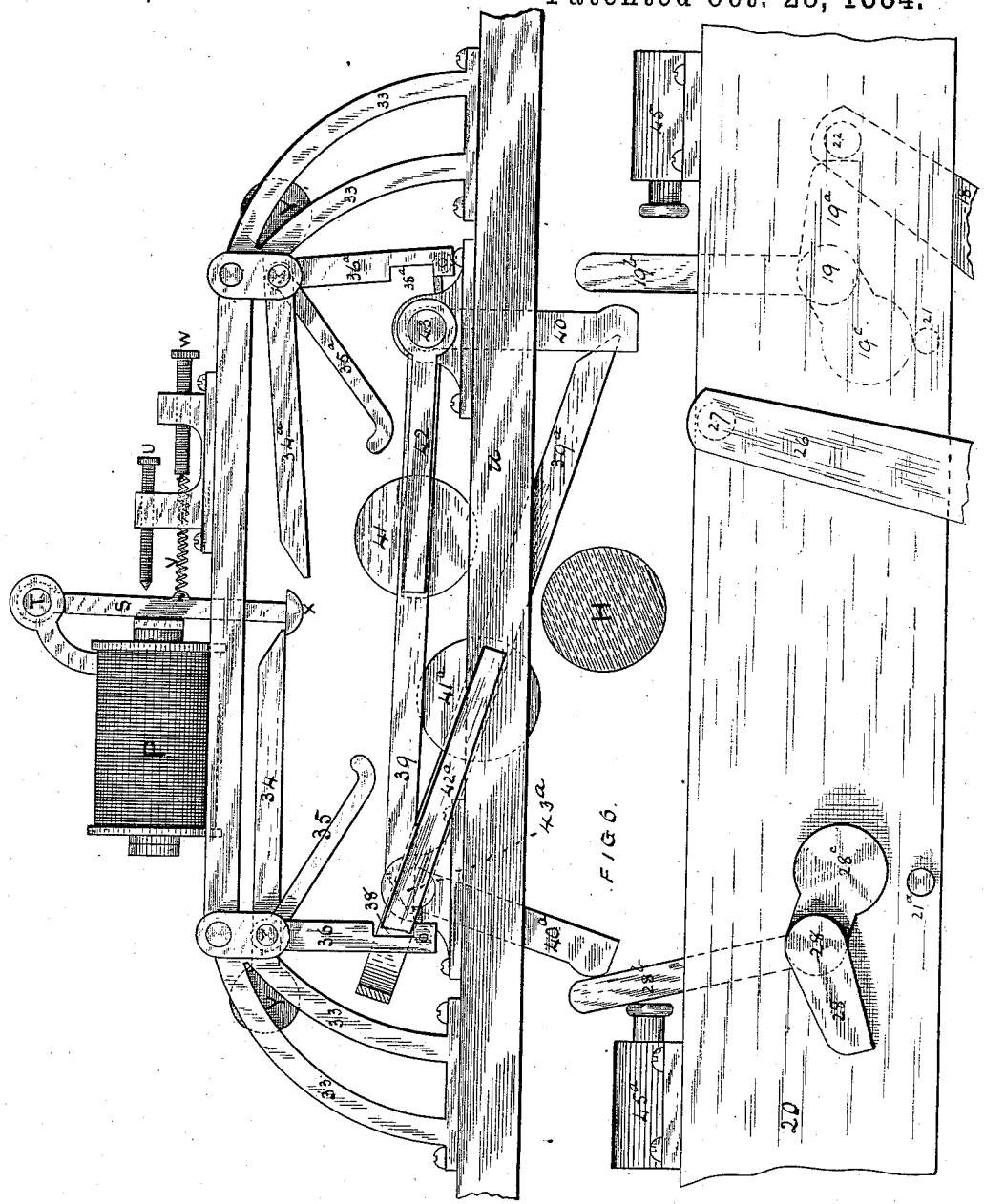
Figure 7:
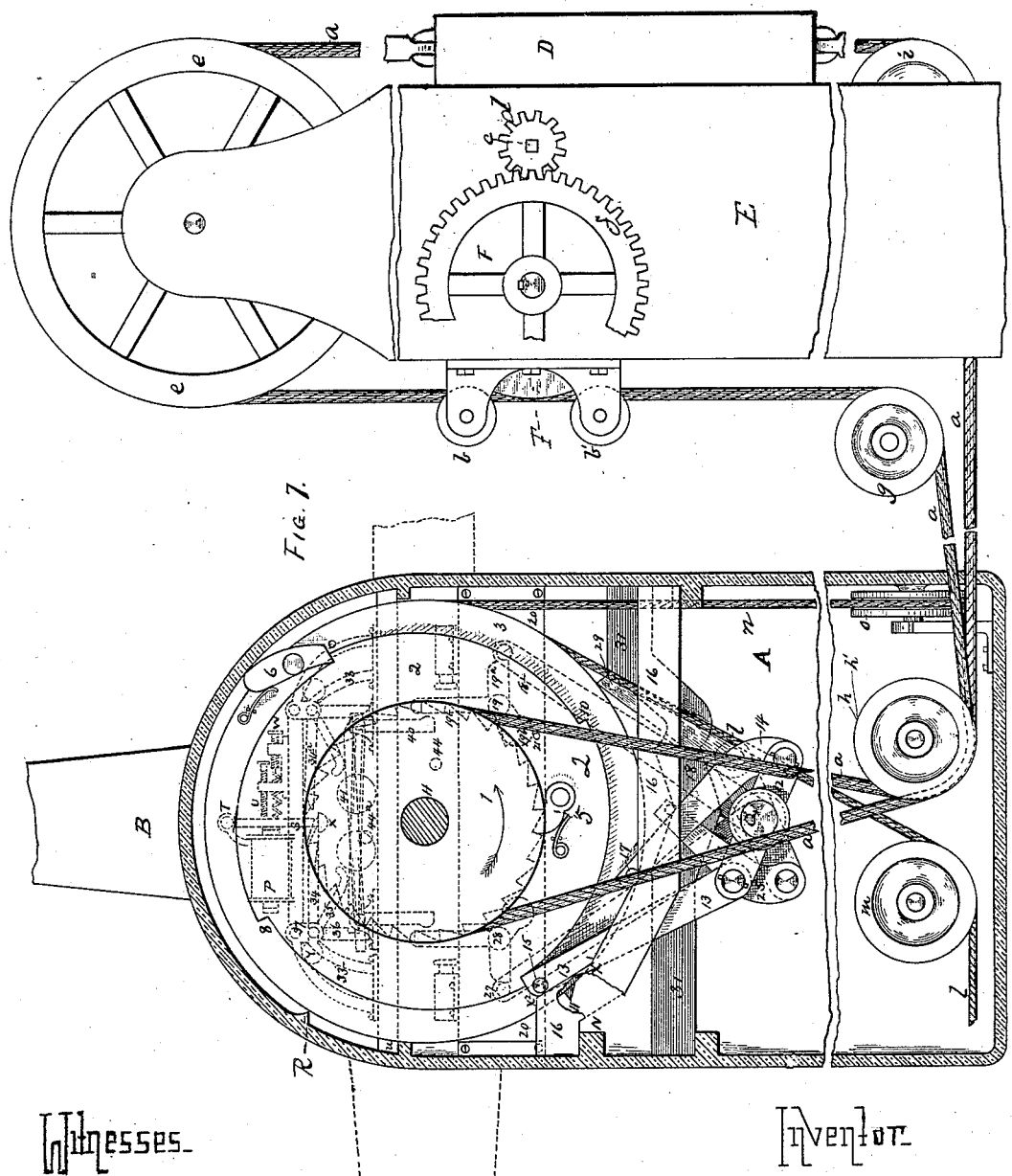
Figure 8:
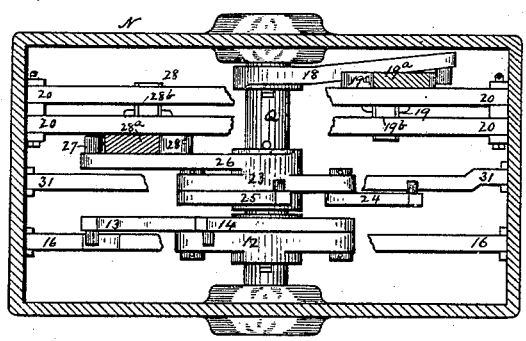
Figure 9:
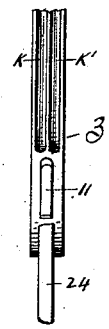

Figure 1 shows two railroad-crossing gates and the devices for opening and closing them simultaneously. Fig. 2 is a front view, on a larger scale, of the sprocket-wheel pulleys and winding apparatus by which the actuating-weight is elevated. Fig. 3 is a front elevation of the upper portion of one of the barrier-standards, showing the apparatus for bringing into action the devices for opening and closing the gates. Fig. 4 is a side elevation of the apparatus shown in Fig. 3, showing the upper portion of the standard in section. Fig. 5 is a top or plan view of the apparatus shown in Fig. 3, the upper portion of the case or standard being removed at the points X X in Fig. 3. Fig. 6 is a front view, on a larger scale, of the devices used to set the apparatus in motion when the gates are to be opened or closed. Fig. 7 is an enlarged vertical sectional view of the barrier-standard A, showing the contained mechanism and its connection with the weight D, which operates on the barrier. Fig. 8 is a horizontal section of the barrier A, showing in detail the arms and pawls, by means of which the extent of rotation of wheels 2 and 3 are limited and defined. Fig. 9 is a detail edge view of part of wheel 3, showing the spring-pawl 11 and part of locking-arm 24.

Like letters and cardinal numbers are employed in the several figures to indicate the same parts.

My invention relates to devices for operating railroad-crossing gates when the barriers composing the gates are raised and lowered by weights, or when power is applied to them independently of the apparatus employed to bring such power into action, and is applicable to the operation of a single gate or barrier, or to one or more pairs of barriers connected together, as hereinafter described, so as to be operated simultaneously.

In Fig. 1, which represents the relative position of two pairs of gates or barriers and the apparatus by which they are operated, A A' A² A³ represent four standards, one pair, A A', being placed on opposite sides of the street or highway which is crossed by a railroad-track, and on one side of the track; and A² A³ represent another pair of standards on the other side of the railroad-track and on opposite sides of the street. Near the top of each standard is pivoted one arm of the gate or barrier, the arms of each pair B B' B² B³ extending horizontally in the same horizontal and vertical planes, so that their extremities nearly touch when the gates are closed, and each being raised to a vertical position when the gates are opened. Each of these barriers has a counterpoise, C, which is sufficiently heavy to raise the barrier to a vertical position whenever it is left free to act, and each barrier is closed against the action of its counterpoise by means of a hanging weight, D, which is of sufficient gravity to draw down all four barriers and raise the four counterpoises, C, to a horizontal position, as shown in Fig. 1.

As the devices through which the weight D is caused to operate on the barrier B to close it are located in the standard A, it is important to prevent the sudden jar to which it would be exposed when the barriers come to rest either in a horizontal or vertical position. For this purpose a spring, G, is attached to the standard A in such position as to cushion the barrier B when it reaches a horizontal position, and another spring, G', is located on the side of the standard A on which the barrier is placed, so as to cushion the counter-weight C when the barrier rises to a vertical position. These springs may also, if desired, be placed on the other standards, A' A² A³; but this will not usually be necessary.

The action of the weight D on the barriers B is brought into operation, in order to close them, by means of an apparatus which may be located in any one of the four standards. In the drawings it is represented as placed in the standard A. Near to the standard which contains this apparatus is a vertical post or column, E, which may be conveniently placed at the inner side of the sidewalk of the street.

At the top of the column E is a pulley, $c$, over which passes a chain, $a$, attached to the upper end of the weight D. To the lower end of the weight D is fastened the other end of the chain $a$. A portion of the chain $a$ is composed of links suitable for engaging the teeth of a sprocket-wheel, F, the axis of which is horizontal and has its bearings in the column E. The links of the chain are kept in gear with the sprocket-wheel by means of two small wheels, $b\ b'$, placed above and below the sprocket-wheel F, as shown in Fig. 1 and on a larger scale in Fig. 2. The weight D is raised to the top of the column E by means of a winding-shaft, $c$, and pinion $d$, gearing into a cog-wheel, $f$, on the shaft of the sprocket-wheel F. (See Fig. 2.) As the barriers are closed by the descent of the weight D, it has to be wound up at intervals; but as the descent of the weight through a vertical distance of a few inches serves to close the barriers they may be closed several times by a single winding up of the weight. So much of the chain $a$ as gears into the sprocket-wheel F (equal to the height of the column E very nearly) must be made of links suitable to engage the teeth of the sprocket-wheel. The remainder of the chain may be composed of ordinary links; or a rope of steel or other material may be substituted for that portion of the chain $a$ which does not come in contact with the sprocket-wheel F. From the upper end of the weight D the chain $a$ extends upward to the top of the column E, over the pulley $e$, and down the other side of the column, and over the sprocket-wheel F, under a sheave, $g$, located near the bottom of the column, and thence, preferably through an underground pipe, to a sheave, $h$, at the base of the standard A; thence it passes upward and over a wheel, 1, in the electro-magnetic apparatus, and thence down again to another sheave, $h'$, which is concealed by sheave $h$ in Fig. 1 at the base of the standard, and thence, through the underground pipe before mentioned, to the bottom of the column E, whence, passing under a sheave, $i$, it passes up the column E to the weight D, to the under end of which it is attached, as shown in Fig. 1. It will be seen that as the weight D descends by gravity it causes the wheel 1 to revolve, and as the wheel 1 is so connected with the shaft to which the barrier B is rigidly attached, as hereinafter described, that it lowers the barrier when the wheel 1 is revolved by the descent of the weight D, but does not move the barrier when revolved in the opposite direction, the weight D may be raised by means of the winding-shaft $c$ at any time without affecting the position of the barriers. As the barrier B when raised to a vertical position is closed by a quarter-revolution of the wheel 1, it is obvious that a few inches of descent of the weight D will accomplish this result.

On the shaft H, on which the barrier B is rigidly mounted, is fixed inside of the standard A a wheel, 3, of larger diameter than the wheel 1. The periphery of this wheel 3 has two parallel grooves, $k\ k'$. (See Fig. 4.) A chain or rope, $l$, is fastened at one end in one of the grooves, $k$, of the wheel 3 on the side nearest to the barrier B, which rope extends over the wheel 3 and downward under a sheave, $m$, at the base of the standard A, and thence through an underground pipe across the street to a sheave, $m'$, at the base of the standard A', on the opposite side of the street, and thence over a grooved wheel, K, passing up on the side nearest to the barrier, and being fastened to the wheel K on the opposite side. The wheel K being of the same diameter as the grooved wheel 3 in the standard A, and being rigidly attached to the shaft of the barrier B', the closing of barrier B will also cause the barrier B' to close simultaneously. So, in like manner, the barriers B² and B³, on the opposite side of the railroad-crossing, are simultaneously closed by means of a rope, $n$, one end of which is fastened to the wheel 3 in the groove $k'$, and passing thence downward to a sheave, $o$, crosses the railroad-track by an underground pipe to a sheave, $p$, at the base of the standard A², and thence up to a grooved wheel, L, at the top of the standard A², to which the end of the rope $n$ is attached. The wheel L has two grooves and a rope, $q$, attached to the second groove in the wheel L on the opposite side to that at which the rope $n$ is attached, passes down and under a sheave, $r$, at the base of the standard A², and across the street through an underground pipe to the base of the standard A³, where, passing under a pulley, $r'$, it rises to a grooved wheel, M, fixed to the shaft of the barrier B³, to which the end of the rope is attached. The grooved wheels are all of the same diameter, and the cords are so connected with them that when the barrier B is either opened or closed a simultaneous opening and closing of the other three barriers is effected. It is necessary that the wheel 3 on standard A should make a quarter-revolution in one direction to close the barrier B, and in the opposite direction when the barrier B is opened by the counter-weight C, and also that the wheel 1 should turn the shaft of the barrier B to close it, but should remain stationary (being then disconnected from the wheel 3) when the barrier B is opened, so as to leave the counter-weight free to act in raising the barrier, which otherwise it could not do, owing to the preponderating gravity of the weight D.

I will now proceed to describe the construction and operation of the apparatus by which the weight D is caused to operate in closing the barrier B, and whereby, after the gate has been closed, the connection between the weight D and the gate-operating devices is sundered, so as to leave the barrier free to rise by the action of the counter-weight C, and whereby also the barriers are held in either a closed or opened condition until released and set in operation by the touch of the key of a circuit-breaker.

Figs. 3, 4, and 6 represent the electro-magnet and connected apparatus on a large scale. This apparatus is contained in a frame or case, N, which is inclosed in the upper part of the standard A, or forms part of the said standard. In the upper part of this case is the electro-magnet P and its connections, by which the levers for opening or closing the barriers are operated. This apparatus is supported on a transverse shelf, u. Below this is the horizontal shaft H, which is rigidly attached to the barrier B, so that when the shaft is turned by means of the weight D it brings the barrier to a horizontal position, and that when the counterpoise C is free to act it raises the barrier B and causes the shaft H to turn, as before described. Below the shaft H is another horizontal shaft, Q, which has its bearings in the frame N, and on which the arms and pawls by which the extent of rotation of the wheels 2 and 3 is limited and defined are mounted.

In Figs. 3, 4, 5, and 7 the relative position and connection of the wheels 1, 2, and 3 are shown. The wheels 1 and 2 are loosely mounted on their shaft H, and the wheel 3 is rigidly fixed thereto, so that the wheel 3 always turns when the barrier B is raised or lowered. The wheels 1 and 2 turn with the wheel 3 when the barrier is lowered, but remain stationary when the barrier is raised. These wheels 1, 2, and 3 are placed near together, side by side, wheel 2 being situate between wheels 1 and 3, and being of larger diameter than wheel 1 and smaller than wheel 3. As already explained, the wheel 1 is moved by the chain $a$ as the weight D descends, and this motion is communicated to the wheel 2 by means of the pawl 5, which so connects the two wheels that when the weight D is elevated by means of the winding-shaft to the top of the column E the wheel 2 remains stationary. The function of the wheel 1 is merely to communicate a rotary motion to the wheel 2 on the descent of the weight D, and to permit of the revolution of the wheel 1 in the reverse direction without causing any rotation of the wheels 2 and 3. The wheels 2 and 3 are similarly connected by a spring-pawl, 6, (see Figs. 3 and 7,) which engages one or other of the four ratchet-teeth 7 8 9 10, which are situate on the periphery of the wheel 2 at equal distances apart, so that the distance between each of these teeth and the next one is an arc of ninety degrees. On the periphery of the wheel 3 is a spring-pawl, 11, (see Fig. 3,) the function of which will be hereinafter explained. The operation of these wheels 1, 2, and 3 is as follows: When the gates are open, the barriers B being in a vertical position, the wheel 1 is turned (by means of the chain $a$, acted on by the descent of the weight D) in the direction of the arrow in Fig. 3 a quarter-revolution, carrying with it the wheels 2 and 3. The motion is then arrested, as hereinafter explained, the barrier having assumed a horizontal position. When the gate is to be opened, the revolution of the shaft H, effected by the counter-weight C raising the barrier B, causes the wheel 3, fixed to shaft H, to turn back again through a quarter-revolution, while the wheels 1 and 2 and the weight D remain stationary. The spring-pawl 6 in the wheel 3, engaging one of the ratchet-teeth in the wheel 2, as before stated, causes the revolution of the wheels 1 and 2 in the direction of the arrow in Fig. 3 to effect a similar revolution of the wheel 3; but as the wheels 1 and 2 always revolve in the same direction and revolve only while the barrier is being closed, while the wheel 3, after performing a quarter-revolution in the direction of the arrow, moves back again while the barrier is rising, it becomes necessary to release the wheel 3 from its connection with the wheel 2 at the close of the quarter-revolution, when the gate has been closed. To effect this, the rear end of the spring-pawl 6 projects beyond the periphery of the wheel 3, (see Figs. 3 and 7,) and its projecting end is rounded. A curved projection, R, projects from beyond the frame N at the proper point, so that when the wheels 1, 2, and 3 finish their quarter-revolution in opening the gate the spring-pawl 6 is pushed back, disengaging the wheel 3 from wheel 2, and setting it free to turn back again when the gate is opened.

The barrier B is held in an elevated or in a horizontal position when the gate is open or closed in the following manner: Rigidly mounted on the shaft Q is a rocking arm, 12, extending an equal length radially from center of shaft Q on either side. To each extremity of the rocking arm 12 is pivoted one of the arms 13 and 14, both of which extend upward toward the wheel 2, and both being inclined, as seen in Fig. 3, to the left of the center of the shaft Q. The motion of these arms 13 and 14 toward the periphery of the wheel 2 is defined by a stud, 15, which projects sidewise from the extremity of the arm 13 and rests upon the upper edge of a bar, 16, which extends across the frame N, and by a stud, 17, which projects from the extremity of the arm 14 and rests also upon the upper edge of the bar 16, as seen in Fig. 3. The bar 16 extends horizontally from the right-hand side of the frame to a point at $x$, where it inclines upward to the point $x'$, and from that point to point $x^2$ the degree of inclination is increased. The effect of this is that when the rocking arm 12 is in the position shown in Fig. 3 the arm 13 is raised until its upper extremity engages the tooth 7 on the periphery of the wheel 2, the stud 15 being held up by the bar 16, so as to keep the arm 13 pressed against the edge of the wheel 2, and so long as the arm 13 thus engages the tooth 7 in the wheel 2 the barrier cannot be closed, because to do so it is necessary that the wheel 2 should be turned to the left in the direction indicated by the arrow in Fig. 3. The arm 13 is held in that position, engaging the tooth 7 of the wheel 2 by means of a locking-arm 18, which extends radially from the center of the shaft Q. This locking-arm 18 is rigidly attached the shaft Q, and extends upward in the opposite direction from the arm 13, so as to engage the stop 19. The stop 19 is pivoted to a cross-piece, 20, which extends across the frame N. It has three arms, $19^a$, $19^b$, and $19^c$, of which one, $19^a$, extends horizontally toward the side of the frame. Another arm, $19^b$, extends vertically upward, and the third, $19^c$, inclines downward toward the middle of the frame. The arm $19^c$ is weighted so as to incline downward, and a pin, 21, projecting from the cross-piece 20, is so placed that when the weighted arm $19^c$ rests on it the arm $19^b$ will be in a vertical, and the arm $19^a$ in a horizontal, position, as shown in Figs. 3 and 7. A stud, 22, projecting from the side of the locking-arm 18 at the upper extremity, engages the arm $19^a$ of the stop, and thus prevents the locking-arm 18 from moving toward the middle of the frame, without which the arm 13 cannot be withdrawn from its engagement with the tooth 7 of the wheel 2. When the vertical arm $19^b$ of the stop 19 is moved to the right in the manner hereinafter described, the extremity of the arm $19^a$ is depressed, releasing the locking-stud 22 on the locking-arm 18. The locking-arm is then free to turn with its axis (the shaft Q) and assume a nearly vertical position, which it is forced to do by the pressure of the tooth 7 on the extremity of the arm 13, caused by the effort of the wheel 2 to rotate in the direction of the arrow in Fig. 3, through the instrumentality of the weight D, as before described. The barrier B then commences to turn toward a horizontal position, the wheel 1 continuing to turn, and with it the wheels 2 and 3, until the tooth 7 of wheel 2 reaches the position of the tooth 10 in Fig. 3, when the gate is closed. As the wheel 2 turns and the arm 13 is pressed down, the rocking arm 12 vibrates and raises the arm 14 at the other end of the rocking arm. As the arm 14 rises, it pushes the arm 13 out from the tooth 7, and then itself engages that tooth. As the wheel 2 continues to turn, it now depresses the arm 14, so that the arm 13 is forced to rise again (the vibration of the rocking arm 12 being thus reversed) until it reaches its former position. By this time the tooth 8 on the wheel 2 has reached the point opposite $x^2$, Fig. 3, formerly occupied by the tooth 7, and the tooth 8 then engages the end of the arm 13, and the locking-arm 18 being swung back by the reversal of the motion of the rocking arm 12, its stud 22 again engages the arm $19^a$ of the stop and locks the wheel 2, and with it the wheel 1, in the new position it has then assumed, the gates being then closed.

On the shaft Q is loosely mounted, also, another rocking arm, 23, which has two arms, 24 and 25, pivoted to it and extending upward toward the periphery of the wheel 3. These arms 24 and 25 incline in the opposite direction (to the right) from that of the arms 12 and 13, and a locking-arm, 26, rigidly attached to the sleeve of the arms 24 and 25, extends upward, inclining to the left of the shaft Q. This locking-arm has a locking stud, 27, projecting sidewise from its upper end, which engages the horizontal arm of the pivoted stop 28. This stop is pivoted to the cross-piece 20, and is the counterpart of the stop 19, before described, and operates in the same way in connection with the locking-arm 26 and its stud 27 as does the stop 19 with the locking-arm 18 and its stud 22, the swinging stop 28 operating when the gate is to be opened as the swinging stop 19 does when the gate is to be closed, with this difference, however, that the arms 13 and 14 engage the ratchet-teeth on the wheel 2, while the arms 24 and 25 engage the spring-pawl 11, which is pivoted to the wheel 3 at its periphery.

When the gate is closed, as before described, and the wheels 1, 2, and 3 have completed their quarter-revolution, the tooth 8 of wheel 2 being engaged by the arm 13, (instead of the tooth 7, as in Fig. 3,) the spring-pawl 11 will have reached the point $y$, and will pass over and become engaged by the arm 24, thus preventing the wheel 3 from turning backward until permitted to do so, when the gate is to be opened again in the manner which I will proceed to describe.

The arms 24 and 25, pivoted to the two extremities of the rocking arm 23, as before stated, have each of them a stud, 29 and 30, projecting sidewise and resting on the upper edge of the cross-piece 31 of the frame N. This cross-piece 31 has also two inclines, as shown in Fig. 3, which, by means of the studs 29 and 30, direct the extremities of the arms 24 and 25 as they approach or recede from the circumference of the wheel 3. When the stud 27 at the end of the locking-arm 26 is released from the stop 28 in the manner hereinafter described, the wheel 3 is free to revolve in the direction opposite to that of the arrow in Fig. 3, while the wheel 2, (and with it the wheel 1,) is still locked in position by the locking-arm 18 and stop 19, as before described. The counter-weight C on the barrier B then raises the barrier B, and causes the wheel 3 to make a quarter-revolution to the right. As the wheel 3 revolves to the right, the spring-pawl 11, engaging the arm 24, presses it down, causing the rocking arm 23 to vibrate, and the arm 25 rises toward the wheel 3, disengaging the extremity of arm 24 from the spring-pawl 11 and taking its place; but as the wheel 3 continues its revolution it forces back the arm 25, reversing the vibration of the rocking arm 23 and raising the arm 24 up again into contact with the wheel 3. This also swings back the locking-arm 26 to its former position, so that when the wheel 3 has completed a quarter-revolution and the barriers are raised the stud 27 of the locking-arm 26 again engages the stop 28, and the arm 24 is in position to engage the spring-pawl 11, when the gate is again closed, and the further rotation of the wheel 3 is prevented. When the barriers B are either in a vertical or horizontal position, the position of the locking-arms 18 and 26 relatively to their stops 19 and 28 is that shown in Fig. 3, so that the barrier can neither be raised nor lowered unless the obstruction is removed. If, however, the gates should be open, the pushing of the vertical arm of the stop 19 outward from the center of the machine will release locking-arm 18, when the wheels 1, 2, and 3 will move together, being actuated by the weight D until, on completing a quarter-revolution, the arm 13 engages a ratchet-tooth, 8, on the periphery of the wheel 2, and the locking-arm 18 and stop 19 prevent its displacement. If, on the other hand, the gates should be closed and it is desired to open them, the vertical arm 28$^b$ of the stop 28 is pushed outward, which releases the locking-arm 26, when the wheel 3 alone makes a quarter-revolution, being turned by the raising of the barrier by its counter-weight, while the wheels 1 and 2 remain stationary.

It will be noticed that the barriers are closed solely by the action of the weight D, and are raised solely by their counter-weights C, the weight D being prevented from exerting any force on the barriers when they are being raised by the fact that the wheel 3 on its backward motion to open the gates has been freed from its connection with the wheel 2, by the raising of the spring-pawl 6, by its tail coming in contact with the projection R on the frame N, as before described.

It now remains to be shown how the stops 19 and 28 are operated, the one to close the gates and the other to permit them to open. In the upper part of the frame N, above the shaft H, is a shelf, $u$, on which is supported the electro-magnetic apparatus. On an elevated frame, 33, is placed the electro-magnet P, consisting of a pair of coils. In front of the poles of the electro-magnet is an armature, S, suspended from a point, T, above the magnet, so as to vibrate between the poles of the magnet and the point of the adjustable screw-stop U. V is the retracting-spring of the armature S, which is provided with an adjustable tension-screw, W, in the usual manner. At the lower end of the armature S, which extends downward below the frame 33, is a button, X, so arranged as to engage and support one or other of the levers 34 34$^a$, which extend horizontally under the frame 33, with their free ends within range of the vibrations of the button X of the armature S.

The devices which I am about to describe, connected with the lever 34, are designed to operate the vertical arm 19$^b$ of the stop-lever 19, and connected with the lever 34$^a$ are a similar set of devices to operate the stop-lever 28. It will therefore be only necessary to describe one set in detail. The lever is rigidly attached to its shaft, so that the arms 35 and 36, which are also rigidly attached to the same shaft, may operate with it. The lever 34 has a short extension on the other side of its shaft, to which is fastened a counterpoise, Y, of sufficient weight nearly, but not quite, to balance the arms 34 and 35. The purpose of this is to relieve the armature S of the magnet from any unnecessary strain and enable it to operate freely. The arm 36 extends downward from the shaft of the lever 34 at right angles to lever 34, and between 34 and 36 on the same shaft is the arm 35, which extends downward toward the center of the machine at an angle of about forty-five degrees to the lever 34. The lower end of the arm 35 is curved. The shaft of the lever 34 and arms 35 and 36 has its bearings in the standard 33 of the electro-magnet. At the lower end of the arm 36 is a notch, 38, which receives and sustains the extremity of the striking-lever 39. The striking-lever is rigidly attached to its shaft 43, the bearings of which rest on the shelf $u$. To the same shaft 43 is also rigidly attached the knocker 40, which is an arm hanging down in the plane of motion of the vertical arm 19$^b$ of the stop-lever 19. (See Fig. 6.) Attached to the striking-lever 39, or to another arm rigidly fixed to the same shaft, is a weight, 41, which, when the striking-lever drops, serves to give impetus to the stroke of the knocker 40 against the vertical arm 19$^b$ of the stop-lever. A lifting-arm, 42, is also rigidly attached to the shaft of the striking-lever 39, and extends from its pivotal point, parallel with the arm 39, far enough to engage a pin, 44, which projects from the side of the wheel 3. In Fig. 3 the pin 44$^a$, which operates in connection with the other set of levers, is shown in position under the lifting-arm 42$^a$ after it has raised it up. The pin 44$^a$, in the position shown in Fig. 3, holds the free end of the arm 39$^a$ slightly above its support on the arm 36$^a$, and the arm 39$^a$, in turn pressing against the arm 35$^a$, holds the arm 34$^a$ above its support on the button X, so that the latter may pass freely under the arm 34$^a$, when it is withdrawn from the arm 34. In consequence of the withdrawal of the button X from the arm 34 the wheel 3 rotates to the left, when the pin 44$^a$, passing from under the arm 42$^a$, permits the free ends of arms 39$^a$ and 34$^a$ to rest, respectively, upon their supports on the arm 36$^a$ and the button X. When the button X is again carried to the left, the arm 36$^a$ is carried to the right, allowing the arm 39$^a$ to swing clear, and the free end of the arm 34$^a$ will be below its support on X, as shown in Fig. 6. The arm 34$^a$, in assuming this position, causes the wheel 3 to rotate to the right when the pin 44 recedes from beneath the arm 42, allowing the arm 39 to rest on the catch of the arm 36 and the arm 34 to rest on the button X. At the time the pin 44 passes from beneath the arm 42 the pin 44$^a$ rises and presses the arm 42$^a$, lifting the arms 39$^a$ and 34$^a$ from the positions shown in Fig. 6 to that shown in Fig. 3. The operation of these devices is as follows: The parts being in the relative position which they occupy when the gates are open, (shown in Fig. 3,) in order to close the gates the electric circuit through the magnet P is broken by means of a circuit-breaker. The armature S is immediately retracted by the spring V. This withdraws the supporting-button X from the free end of the lever 34, permitting it to drop. This causes the arm 36, which is rigidly attached to the shaft of the lever 34, to swing backward sufficiently to withdraw its support from the free end of the striking-lever 39, which then drops with considerable force, owing to the weight 41, and the knocker 40, falling with the striking-lever, gives a blow to the upright arm 19ᵇ of the stop-lever 19, causing its short arm 19ᵃ to be depressed, so as to disengage the stud 22 of the locking arm 18, and permit the locking-arm 18 to vibrate toward the center of the machine, with the result of permitting the wheels 1, 2, and 3 to rotate and the barriers to close in the manner before described. As the wheel 3 turns in the direction of the arrow in Fig. 3, the pin 44 comes in contact with the parallel arm 42, raising it, and with it the striking-lever 39 and its weight 41, until the striking-lever 39, coming in contact with the arm 35, raises the lever 34 until its free end is above the button X of the armature S—that is, to the position of the corresponding parts 40ᵃ, 39ᵃ, 34ᵃ, and 35ᵃ in Fig. 3—so that when the armature S is drawn toward the poles of the magnet the arm 34 may be sufficiently raised for the button to pass under it freely. A small spring-buffer, 45, is placed on the other side of the vertical arm 19ᵇ of the stop-lever from the striking-arm 40, to receive the stroke of the arm 19ᵇ and prevent the jarring of the machinery.

The construction and operation of the duplicate set of devices connected with the button of the armature S, by which the upright arm of the stop-lever 28 is operated when the gates are to be opened, is the same as those already described as operating the upright arm of the stop-lever 19 when the gates are to be closed, excepting that, as the free end of the lever 39 extends beyond and intersects the plane of the axis of the arm 42ᵃ, to which axis the lever 39ᵃ and arm 42ᵃ must be attached, the axis of the arm 42ᵃ cannot be extended unbroken to the wheel 3, and as it is necessary that the arm 42ᵃ should be brought within reach of the pin 44ᵃ, projecting from the side of the wheel 3, so that the lever-arm 39ᵃ may be raised up after the stop 28 is liberated, the lever-arm 42ᵃ is extended backward from its shaft and curved round, as shown in Fig. 5, so as to bring it forward of the shaft 43ᵃ, parallel with and close to the side of the wheel 3. When it is desired to open the gates, the circuit is restored through the electro-magnet P, the armature is drawn toward the magnet, the lever-arm 34ᵃ is dropped from the button X, the arm 36ᵃ is drawn away from the extremity of the striking-lever 39ᵃ, which instantly drops, causing the upright arm of the stop-lever 28 to be struck, liberating the locking-arm 26, and permitting the wheel 3 to turn back a quarter of a revolution as the barrier B is raised by its counter-weight.

From the foregoing description it will be seen that the power employed to close the gates is derived exclusively from the weight D, and the power to open the gates entirely from the counter-weights attached to the barriers, and that the power employed to operate the mechanism which I have described is also derived from the same source, so that the force of the electro-magnetic current employed has no other work to perform than simply to move the armature of the magnet against the retractile force of its spring, so that a very small battery-power will be required.

Although I have described in this specification a barrier fixed to a shaft operated by power communicated to such shaft, and the connection of the shaft of other barriers forming part of the same set of gates with the power-operated shaft of one of the barriers by means of a rope or ropes, so that the opening or closing of one of the barriers will cause a simultaneous and like movement of the other barriers, I do not make any claim thereto in this case.

In this specification I have described the barrier as having a counter-weight extending back of the axis of the barrier and of greater weight than the barrier itself, so that the barrier, if left free, will open of itself, the power to close the barrier being derived from a falling weight; but it is obvious that the counter-weight may be dispensed with, so that the barrier will close by its own weight, and the power of the falling weight may be applied to open the gate, and that the apparatus I have described may be applied to such a barrier without other change than so connecting the chain with the primary wheel of my apparatus; that the revolution of the three wheels 1, 2, and 3 shall operate to open the gate, and that the closing of the barrier by its own weight shall operate wheel 3 alone in the reverse direction in the manner hereinbefore described, and that such arrangement is within the scope of my present invention.

It is also obvious that the devices which I have described might be used and operated without the intervention of an electro-magnet by simply attaching a cord to the device which forms the armature of the electro-magnet, so as to move it in one direction or the other accordingly as it is desired to open or close the gates, and such cord might be operated at a distance from the gate.

I am aware that a wheel fixed to the barrier-shaft, a loose wheel journaled on the barrier-shaft, and having clutch-connections with the fixed wheel, a descending weight connected with the loose pulley, and devices for causing the engagement and disengagement of the fixed and loose wheels have heretofore been combined with an oscillating barrier, and do not herein broadly claim the same; but,

Having thus described my improvement, what I claim as my invention, and desire to secure by Letters Patent, is—

1. The combination, in a railroad-crossing gate, of an oscillating barrier, a wheel fixed to the barrier-shaft and movable therewith, a loose wheel journaled on the barrier-shaft, and having clutch-connections with the fixed wheel, a descending weight connected with the loose pulley, a rock-shaft having two pawl-arms which engage with the loose wheel, and a locking-arm, and a trip for tripping the locking-arm, substantially as and for the purposes specified.

2. The combination, in a railroad-crossing gate, of an oscillating barrier, a wheel fixed to the barrier-shaft and movable therewith, a loose wheel journaled on the barrier-shaft, and having clutch-connections with the fixed wheel, a descending weight connected with the loose wheel, a stop device for arresting the motion of the loose pulley during the vertical rise or return movement of the barrier, a stop device for preventing the rise or return movement of the barrier when released from the clutch mechanism of the weighted pulley or wheel, and a trip for tripping the stop or locking mechanism of the barrier, substantially as and for the purposes specified.

3. In a railroad-crossing gate, the combination of an electro-magnet and armature, a lever sustained by said armature, and sustaining a weighted tripping device, a wheel operated by power, and a pin on such wheel for raising the tripping-lever, and a stop device for arresting the motion of said wheel and setting it free to revolve when tripped by such tripping device, substantially as described.

4. In combination with an oscillating barrier of a railroad-crossing gate, a wheel operated by the shaft of the oscillating barrier, and having ratchet-teeth on its circumference, a rocking lever having two arms—one at each end thereof—to engage said ratchet-teeth, with projecting studs on said arms and a guide-bar to regulate the path of motion of the arms by means of the studs, a locking-arm attached to the shaft of the rocking lever, and a movable stop device engaging the locking-arm, for the purpose of permitting a definite partial rotation of the wheel, and arresting its motion when such definite partial rotation is effected, substantially as and for the purpose described.

5. In a railroad-crossing gate, the combination of a weighted oscillating barrier, loose pulley journaled on the shaft of the barrier, a descending weight connected with the loose pulley, clutch mechanism for causing the loose pulley to clutch the barrier-shaft, and a stop device for arresting the return or vertical movement of the barrier when released from the clutch of the loose weighted pulley, substantially as and for the purposes specified.

6. In a railroad-crossing gate, the combination of an oscillating barrier, a wheel fixed to the shaft of the barrier and moving therewith, a loose power-wheel journaled on the barrier-shaft, a pawl for connecting the fixed and loose wheels so that they shall move together during the fall or descent of the barrier, a trip for tripping the pawl and disconnecting the barrier from the power-wheel at the close of its descent, a pawl-arm for locking the fixed wheel and barrier in the lowered position, a pawl-arm for locking the loose or power wheel when released from the barrier, and two sets of tripping devices for tripping said pawls and alternately releasing the fixed and loose wheels of the barrier-shaft, substantially as and for the purposes specified.

7. In combination with the oscillating barrier-shaft of a railroad-crossing gate, a wheel fixed to said shaft so as to revolve in either direction by the opening or closing of said barrier, a second wheel operated by power other than that of the barrier, and having ratchet-teeth on its circumference, and detachably connected with said first wheel by a pawl, a device for releasing said pawl so as to allow of the independent rotation of the wheels, two rocking arms, each having two arms, one pivoted to each extremity, said arms having studs near their free ends, two bars with double inclines for said studs to work against, two locking-arms rigidly attached to each of said rocking arms, two stops, one to engage each of said locking-arms, and a tripping device to release one or other of said stop devices, constructed and arranged substantially as and for the purpose described.

8. The combination of the pendulous arm S or armature of an electro-magnet, the lever 34, its counterpoise, and attached arm 36, the stop 19, the tripping device consisting of lever 39, knocker 40, and weight 41, lifting-arm 42, and pin 44 on the wheel 3, constructed and arranged substantially as and for the purposes described.

In testimony whereof I have hereunto set my hand this 8th day of August, A. D. 1883.

OLIVER H. CLARK.

Witnesses:
W. B. CORWIN,
T. W. BAKEWELL.